United States Patent
Chi

(10) Patent No.: US 7,337,015 B2
(45) Date of Patent: Feb. 26, 2008

(54) METHOD AND APPARATUS FOR CONTROLLING DIGITAL ELECTRONIC PRODUCTS

(75) Inventor: Chung-Ping Chi, Chung Ho (TW)

(73) Assignee: Topseed Technology Corp., Taipei (TW)

( * ) Notice: Subject to any disclaimer, the term of this patent is extended or adjusted under 35 U.S.C. 154(b) by 464 days.

(21) Appl. No.: 11/022,665

(22) Filed: Dec. 28, 2004

(65) Prior Publication Data

US 2006/0142879 A1  Jun. 29, 2006

(51) Int. Cl.
*G05B 15/02* (2006.01)
*G05B 19/18* (2006.01)
*G05B 11/01* (2006.01)
*G06F 1/24* (2006.01)
*G06F 9/00* (2006.01)
*G06F 15/177* (2006.01)
*G06F 11/00* (2006.01)

(52) U.S. Cl. ............................ 700/17; 713/2; 713/100; 714/36; 700/9

(58) Field of Classification Search .................. 700/17, 700/83, 9; 714/36; 713/2, 100
See application file for complete search history.

(56) References Cited

U.S. PATENT DOCUMENTS 5,926,629 A * 7/1999 Gulick ........................ 710/117
2003/0037681 A1 * 2/2003 Zhu et al. .................... 99/325

* cited by examiner

*Primary Examiner*—Ronald D Hartman, Jr.

(57) ABSTRACT

A method and an apparatus for controlling a digital electronic product, using a control signal transmitter and a signal receiver combined with a gate system for controlling a digital home appliance, such that a system activation/inactivation control mechanism is established. The on/off status of the gate system is remotely controlled by the control signal transmitter. In the process of switching off the gate system, a basic input/output system (BIOS) for executing switching on/off is used to detect whether the external connecting port is connected to a signal receiver. When the system is in the off status, the electric connection to the signal receiver is maintained, such that the activation control signal from the control signal transmitter can be received any time. Thereby, the signal status of the signal receiver can be changed to automatically switch on the gate system, and the control signal transmitter can thus remotely control operation of the digital home appliance.

6 Claims, 3 Drawing Sheets

METHOD AND APPARATUS FOR CONTROLLING DIGITAL ELECTRONIC PRODUCTS

BACKGROUND OF THE INVENTION

The present invention relates in general to a method and an apparatus for controlling a digital electronic product, and more particularly, to a computer remote control that combines with a gate system of a digital home appliance, such that the consuming digital home appliance can be switched on or off by a control signal transmitter.

The avalanche of digital era has digitized various home appliances and centrally controlled the operation thereof. In other words, the computer system becomes the control hub and control gate system for all the digital home appliances. Therefore, the on/off control becomes more and humane and easier.

Currently, the on/off operation of a computer system is still significantly different from that of the home appliances. The on/off operation of a computer cannot be executed by simply pressing a power key because the computer system has to executing operation system for switching on or off. That is, the BIOS stored and configured in the computer system has to be executed for switching on/off the computer system. In addition, various application programs have to be activated, such that the on/off operation of the computer system is typically more time consuming compared to the digital home appliance. Therefore, the common control mechanism for the digital home appliance and the computer is difficult to implement.

Many of the computer manufacturers have made certain modification of the hardware of the computer system to allow the computer system switched on/off by a remote control that controls the on/off status of the digital home appliance. Such hardware modification includes modifications of RS232 interface and COM PORT interface to the modification of PS2 interface. All of these interfaces require specific device for application, such that the hardware structure is complicated, and the cost is greatly increased. Therefore, integrated control of computer system and home appliance is not commonly applied by the consumers yet

BRIEF SUMMARY OF THE INVENTION

To resolve the above drawbacks, a gate system for controlling a home appliance is connected to a signal receiver that is able to receive an activation control signal under an off status, such that when a control signal transmitter transmits the activation control signal, the gate system can be automatically switch on, so as to control the operation of the home appliance.

The method and apparatus for controlling a digital electronic product uses a control signal transmitter and a signal receiver connected to a gate system for controlling digital home appliance to establish a system activation/inactivation mechanism. When the off operation of the gate system is executed, the signal receiver is detected as a mutual coupling status. The gate system continuously supplies power to the signal receiver, such that an activation control signal transmitted from the control signal transmitter can be received any time. When the control signal is received, the signal level state of the signal receiver is altered, and the gate system is automatically switched on. The user can thus remotely control operation of the digital home appliance via the gate system by controlling the control signal transmitter.

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

Figure 1:
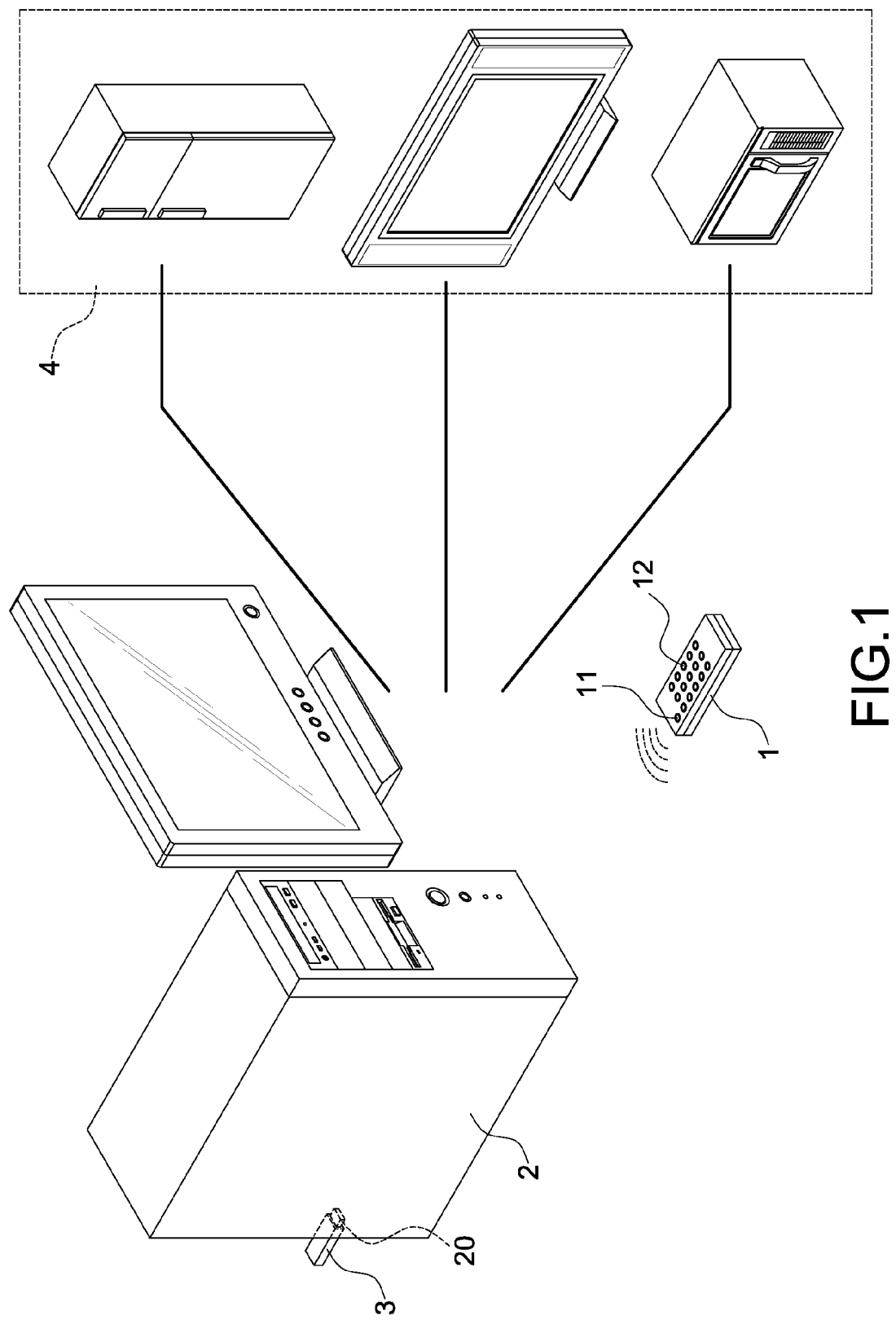
FIG. 1 shows an embodiment of the apparatus for controlling digital electronic products.

Referring to FIG. 1, an embodiment of a digital electronic product control apparatus comprises a control signal transmitter 1 at the user side, a gate system 2 of a digital home appliance 4, and a signal receiver 3 combined with the gate system 2.

The control signal transmitter 1 includes a signal control and input device for one-way signal transmission. In one embodiment, the control signal transmitter 1 is portable device disposed in front of the gate system 2 and the computer system or other position. That is, the control signal transmitter is operative to control activation of the gate system 2. By coupling the gate system 2 with a signal receiver 3 connected to the connecting port such as a USB port for various types of computers or servers, the activation and function operation of the home appliance 4 can be remotely controlled by the control signal transmitter 1. The signal receiver 3 includes a wireless access point (AP), for example.

The control signal transmitter 1 includes a portable or handheld wireless remote control, for example. At least one power key 11 and a plurality of control keys 12 are formed thereon allowing the user to perform on/off operation and function control of the home appliance 4.

The gate system 2 includes a computer system, a server system or other digital control system, for example. The gate system 2 includes at least an external connection port 20 such as a connection port of USB interface. During the off operation of the gate system 2, when the external connection port 20 is detected to coupled with signal connection unit for a specific identification code such as product identification code (PID) or a voltage identification code (VID), the gate system 2 continues supplying power through the external connection port 20 through an internal south bright circuit, such that the normal operation status of the signal connection unit can be maintained.

Figure 2:
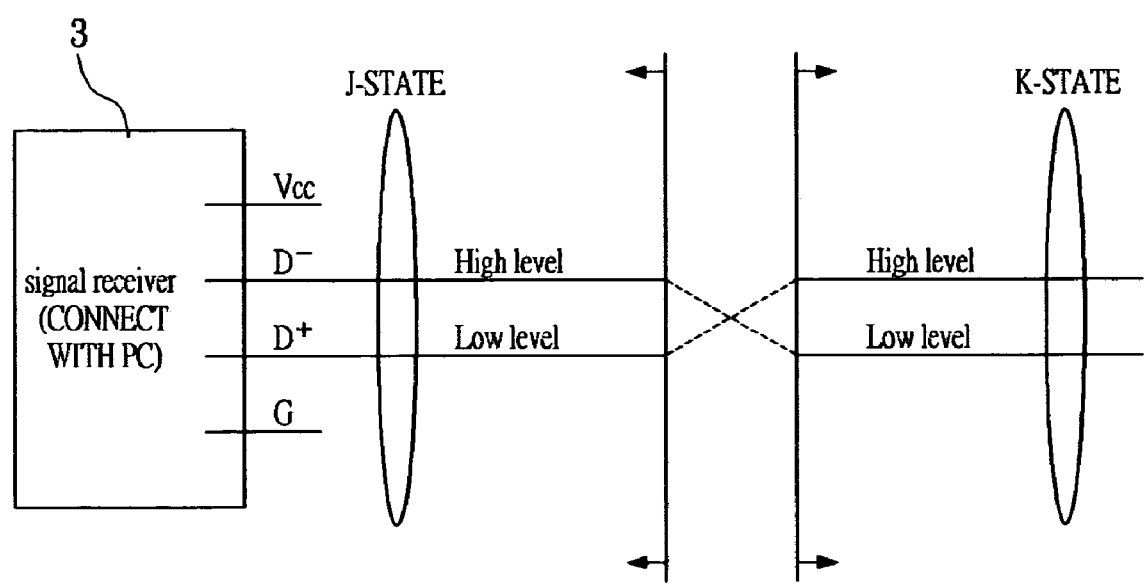
FIG. 2 shows the alteration of signal level of a signal receiver.
Figure 3:
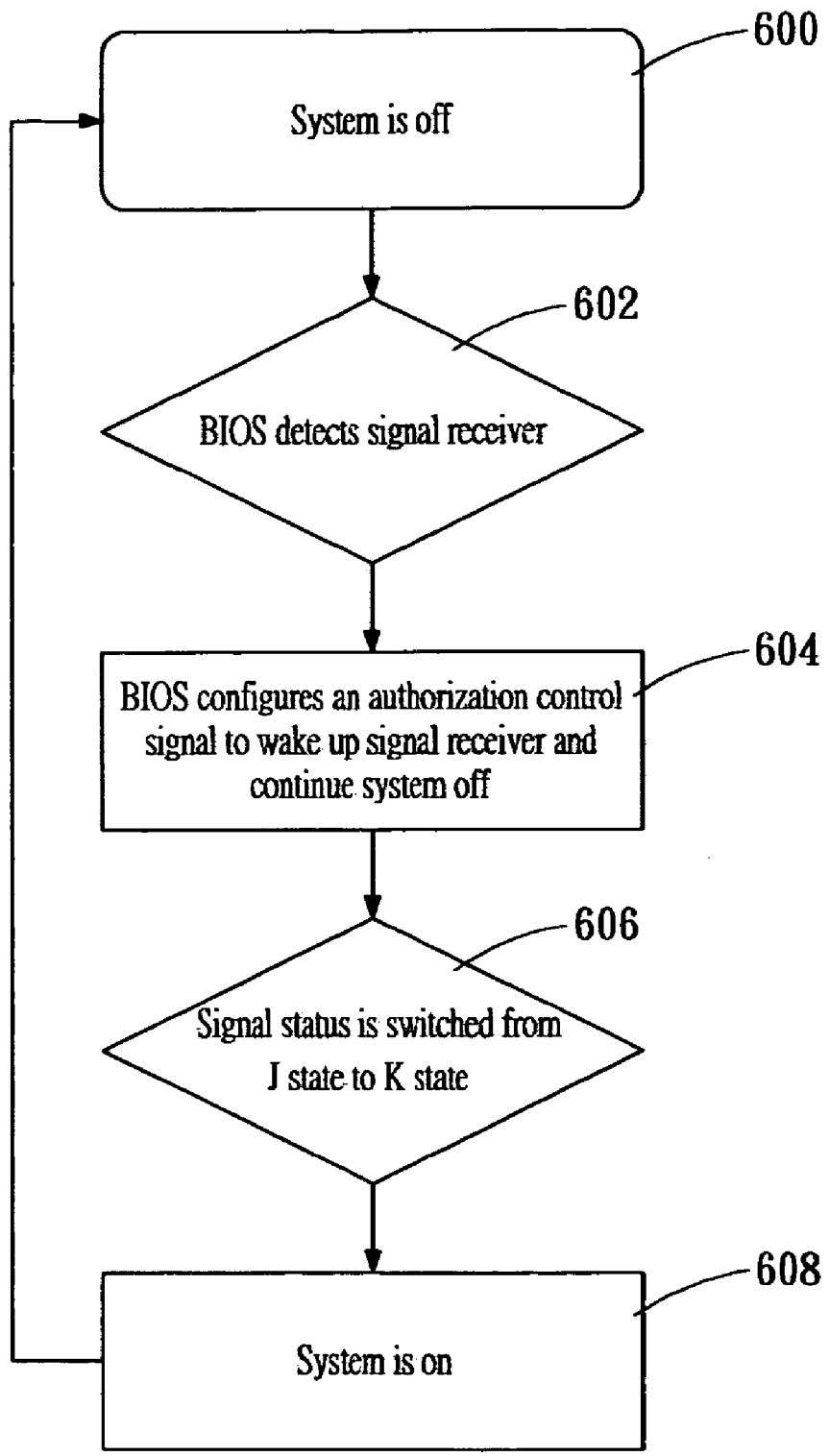
FIG. 3 shows a method of controlling digital electronic products.

The signal receiver 3 is an example of the above signal connection unit coupled to the external connection port 2 of the gate system 2. The signal receiver 2 includes an access point (AP), for example. As mentioned above, the gate system 2 continuously supplies power to the signal receiver 2, such that the signal receiver 2 can receives the control signal transmitter from the control signal transmitter 1 to change the signal status. That is, when the gate system 2 continues supplying power in an off status, the connection port is configured at a J state. That is, the signal level of the DATA+ pin is low, and the signal level of the DATA− pin is high. As shown in FIG. 2, after receiving the control signal, the connection port is switched to the K state. That is, the signal level of the DATA+ pin is switched from low to high, while the signal level of the DATA− pin is switched from high to low. Thereby, a system activation signal is generated.

Through the external connection port 20, the activation signal is input to the gate system 2 to perform on operation. Under the on status, the signal receiver 3 is operative to receive the control signal transmitted from the control signal transmitter 1 for switching on/off or control function of the home appliance 4.

According to the structure of the digital electronic product control apparatus as provided, the gate system 2 can be connected to a plurality of home appliances through a control connection, and coupled to the signal receiver 3 through the external connection port 20 to receive the control signal from the control signal transmitter 1 any time, so as to perform a real time control of the home appliances 4.

The process of control the digital electronic products is further described as follows.

In step 600, the gate system 2 prepares and execute the system off operation according to the off control command. During the off operation, the BIOS starts detection operation.

In step 602, the BIOS detects that the gate system 2 being coupled to the signal receiver 3 through the external connection port 20, such that the BIOS configures an authorization control signal allowing the control signal transmitter 1 to wake up the signal receiver 3, and continue the off operation of the gate system 2. When the off operation of the gate system 2 is complete, power is continuously output from the external south bridge circuit to the signal receiver 3 through the external connection port 20 to maintain the operation status of the signal receiver 3 in step 604.

According to the wakeup signal from the control signal transmitter 1, the signal receiver 3 is operative to detect whether a control signal is transmitted from the control signal transmitter 1. When the control signal is received, the signal status of the pine of the connection port is switched from J state to K stat in step 606. Under the off status of the gate system 2 and the J state of the connection port, the signal level of the DATA+ pin is low, and the signal level of the DATA− pin is high.

When a system-on control signal from the control signal transmitter 1 is received by the signal receiver 3, for example, when the user presses the power key 11, the pin state of the connection port 20 is switched from J to K, and the signal level of the DATA+ pin is switched from low to high, while the signal level of the DATA− pin is switched from high to low. Thereby, a system activation signal is generated and input from the external connection port 20. The gate system 2 is thus in the on status in step 608.

When the gate system 2 is activated, the user can control the function operation of the home appliance by pressing the function keys of the control signal transmitter.

When the user presses the power key 11 of the control signal transmitter 1, the off operation of the gate system 2 is executed by the control signal from the control signal transmitter 1, and step 600 is performed. The pin state of the connection port is switched from K to J, the signal level of the DATA+ pin is switched to low, and the signal level of the DATA− pin is switched to high, so as to maintain the detection status of the control signal.

By the above operation, the gate system 2 and the computer system can provide convenient control of the home appliance. The structure of the control apparatus is simple. In addition, as the USP connection interfaces are common to computer system, plus that each computer may be equipped with more than one USP port, the integrated remote control of home appliances through the gate and computer system becomes easier.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A method of controlling a home appliance, using a control signal transmitter to output a control signal and a signal receiver coupled to a gate system of the home appliance to establish a system activation/inactivation mechanism which continues supplying power to the signal receiver under an off status of the gate system, the method comprising:
   executing an off operation according to an off command, and executing detection operation by a basic input/output system (BIOS);
   detecting whether an external port of the gate system is coupled to the signal receiver by the BIOS;
   waking up the signal receiver by the control signal transmitter according to configuration of the BIOS of the gate system, and changing a pin state of an external connection port of the gate system when the signal receiver receives a control signal transmitted form the control signal transmitter; and
   generating a system activation signal according to the pin state of the external connection port, and inputting the activation signal to execute an on and off operation of the gate system, and controlling operation of the home appliance by controlling the control signal transmitter.

2. The method of claim 1, wherein the on and off operation of the gate system is performed by pressing a power key of the control signal transmitter.

3. The method of claim 1, wherein the signal receiver includes a signal connection device operative to receive a signal transmitted from the control signal transmitter.

4. The method of claim 1, wherein when the state of the external connection port is changed from a J-state which is at an off-state to a K-state which is at an on-state, a signal level of a DATA+ pin of the external connection port is low, and a signal level of a DATA− pin of the external connection port is high, and when the state of the external connection port is in the J-state, the signal level of the DATA+ pin is high, and the DATA− pin is low.

5. The method of claim 1, wherein when it is detected that the external connection port is coupled to the signal receiver having a predetermined identification code when the gate system is off, the gate system includes a south bridge circuit continuing supplying power to the signal receiver to maintain normal operation of the signal receiver.

6. The method of claim 5, wherein the predetermined identification code includes a product identification code or a voltage identification code.

* * * * *